Jan. 7, 1941. E. S. CORNELL ET AL 2,227,925
SWIVEL CONNECTION FOR SWITCHES, BUS BARS, AND THE LIKE
Filed May 12, 1938 6 Sheets-Sheet 1
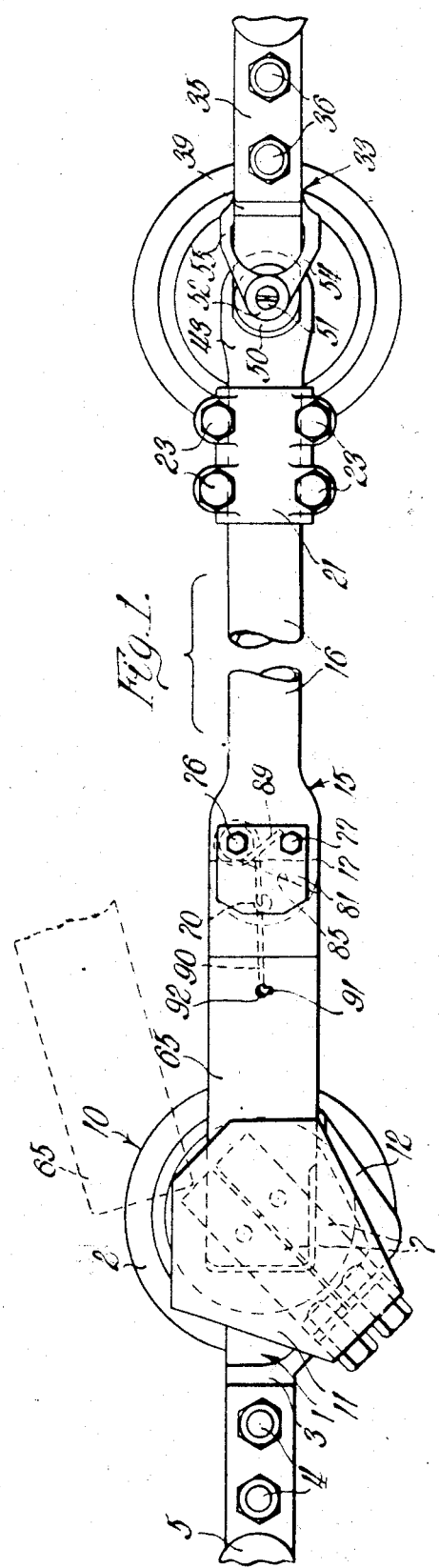
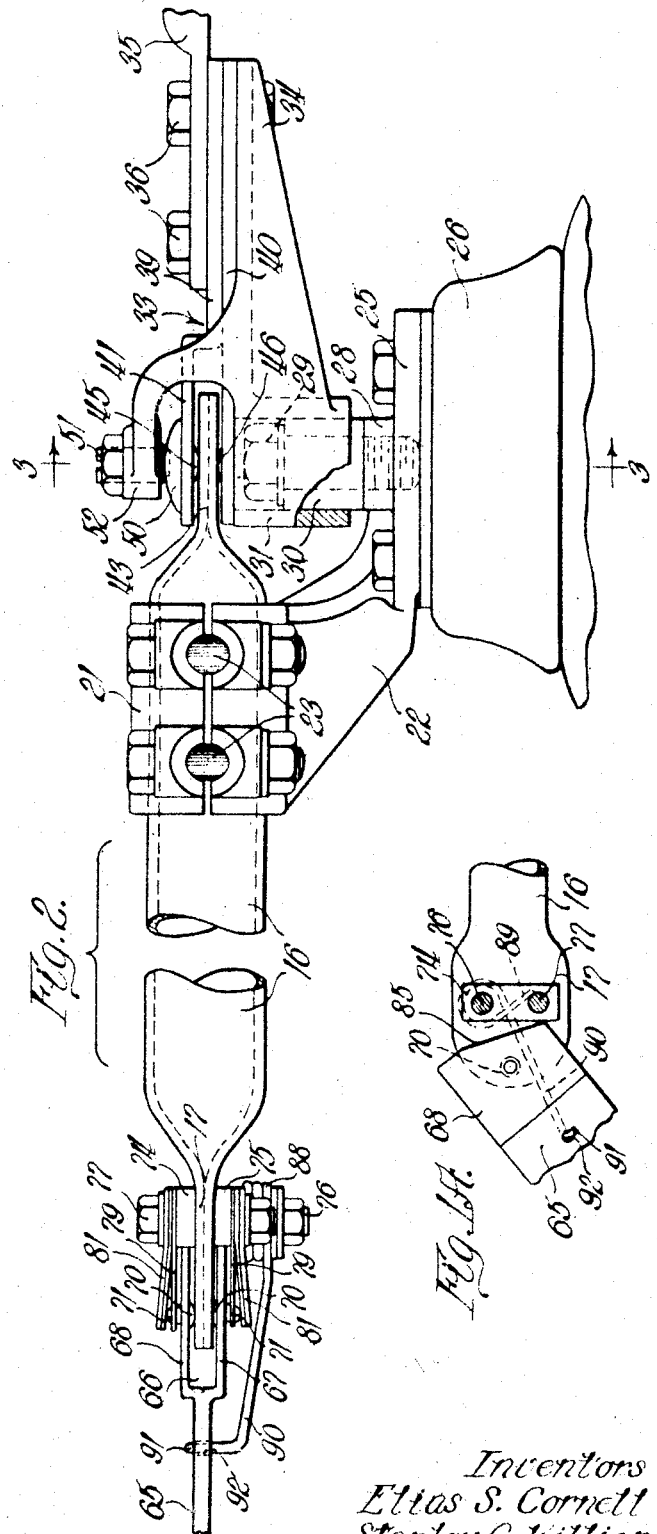
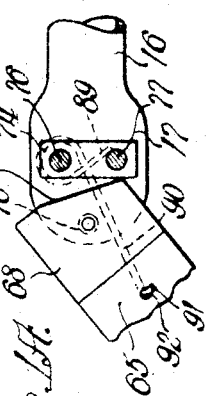
Inventors
Elias S. Cornell
Stanley C. Killian
Joseph A. Stoos
By Mauz Jackson Boucher
Diennes Attys Jan. 7, 1941.   E. S. CORNELL ET AL   2,227,925
SWIVEL CONNECTION FOR SWITCHES, BUS BARS, AND THE LIKE
Filed May 12, 1938   6 Sheets-Sheet 2
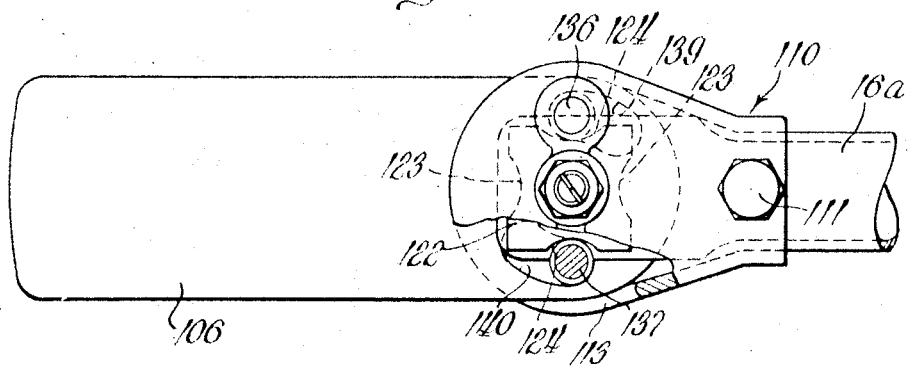
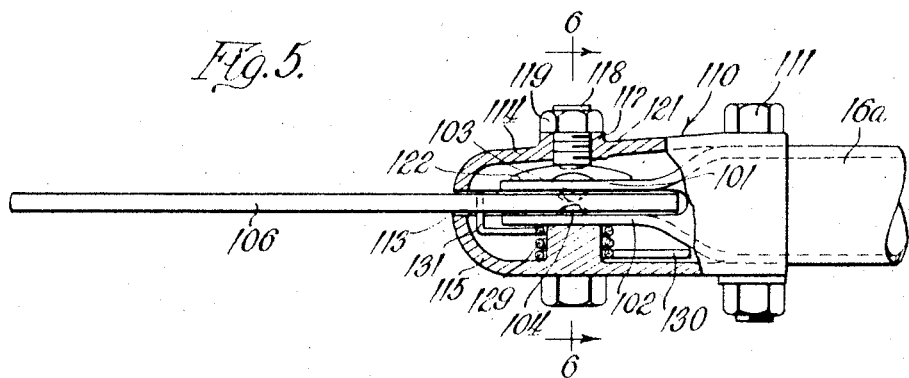
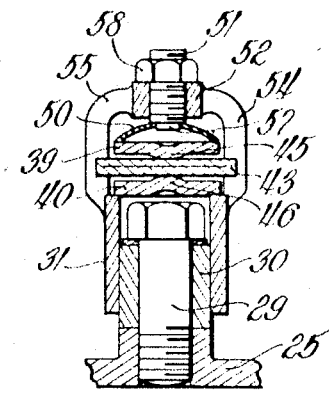
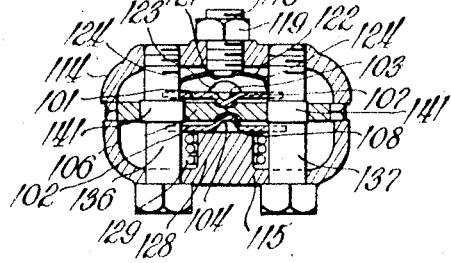
Inventors
Elias S. Cornell
Stanley C. Killian
Joseph A. Stoos Jan. 7, 1941.  E. S. CORNELL ET AL  2,227,925
SWIVEL CONNECTION FOR SWITCHES, BUS BARS, AND THE LIKE
Filed May 12, 1938  6 Sheets-Sheet 3
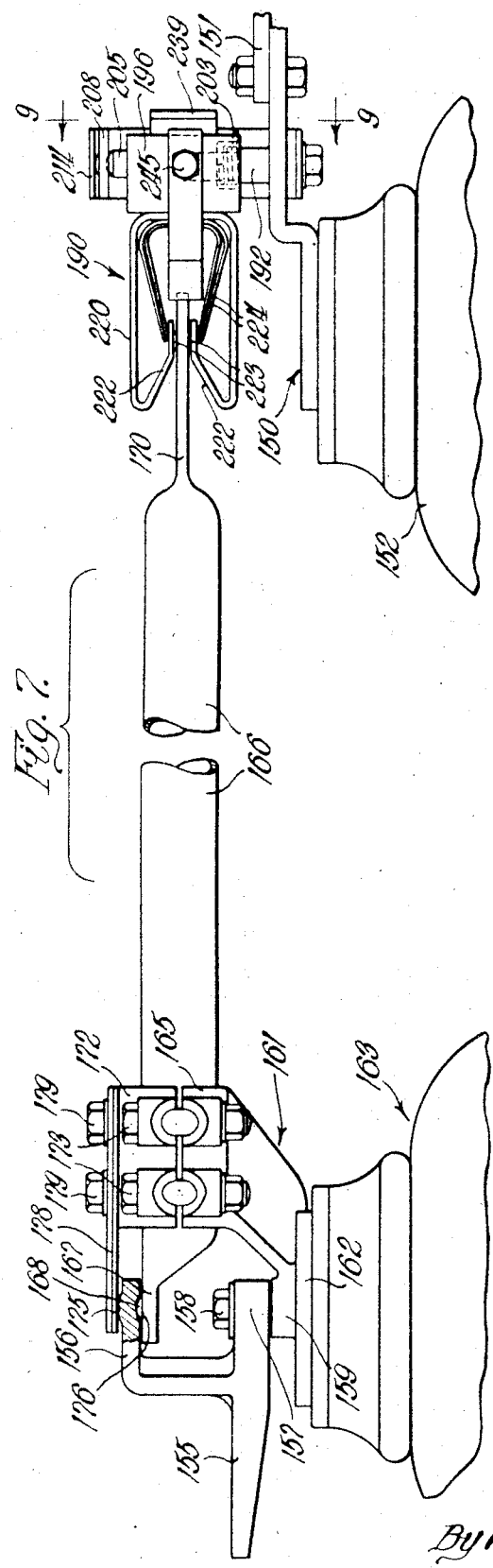
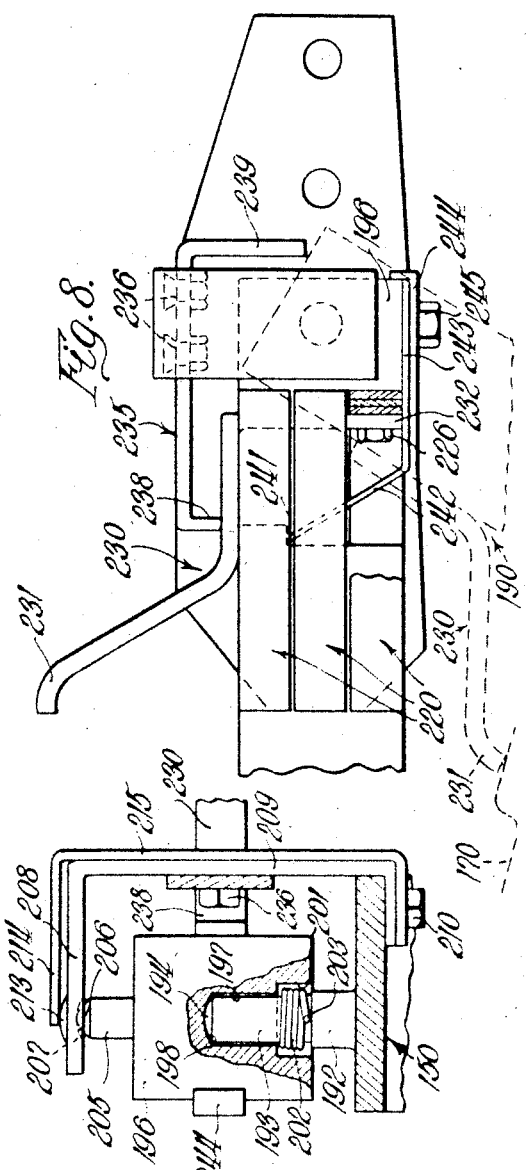
Inventors
Elias S. Cornell
Stanley C. Killian
Joseph A. Stoos Jan. 7, 1941. E. S. CORNELL ET AL 2,227,925
SWIVEL CONNECTION FOR SWITCHES, BUS BARS, AND THE LIKE
Filed May 12, 1938 6 Sheets-Sheet 4
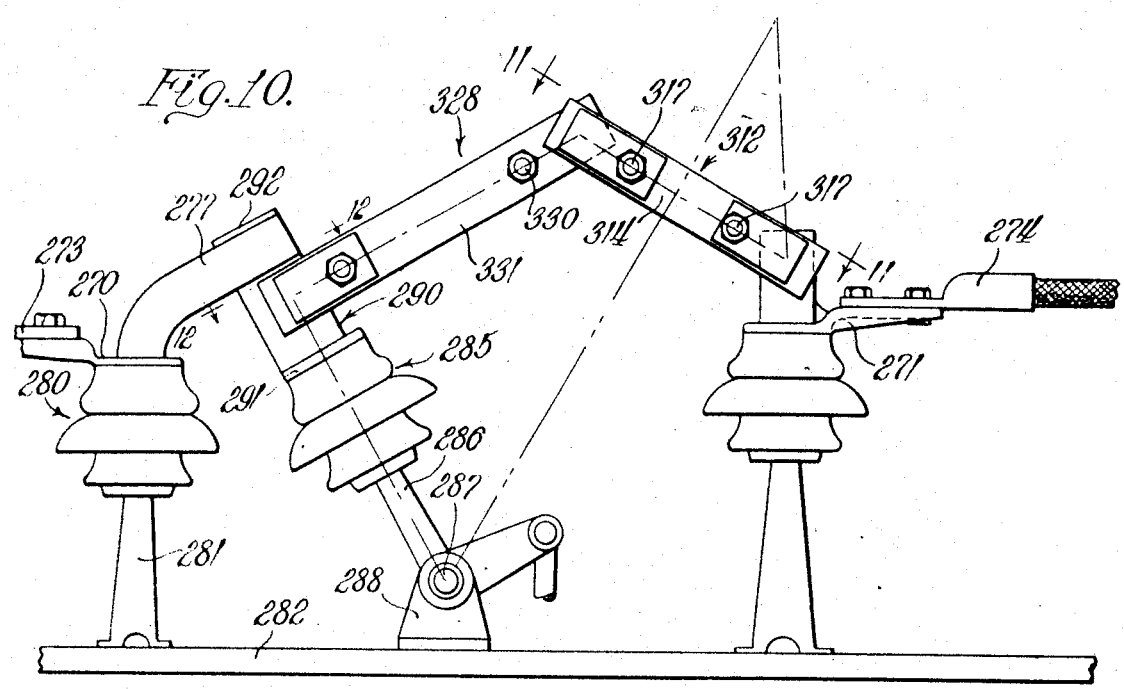
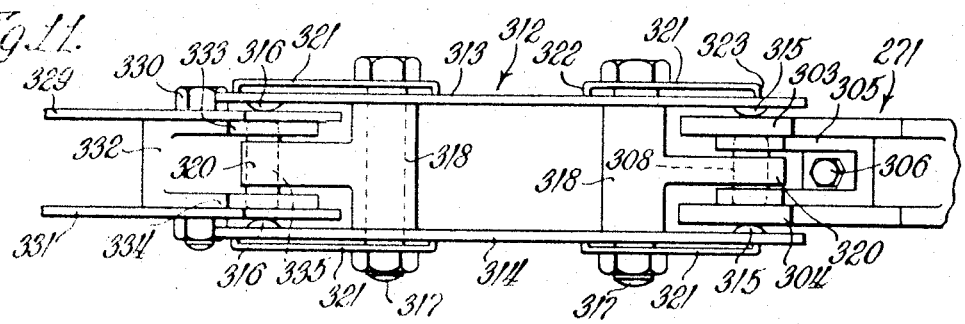
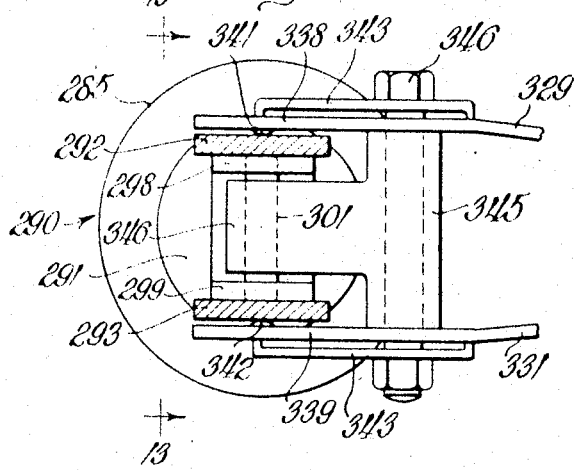
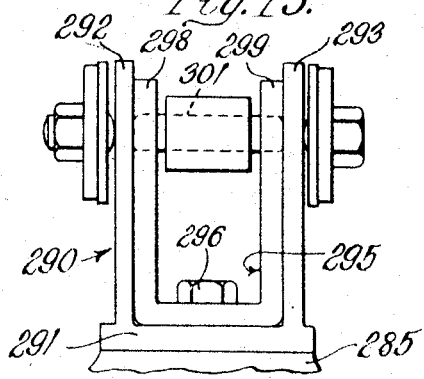
Inventors
Elias S. Cornell
Stanley C. Killian
Joseph A. Stoos
By Brown, Jackson, Boettcher & Dienner Att'ys

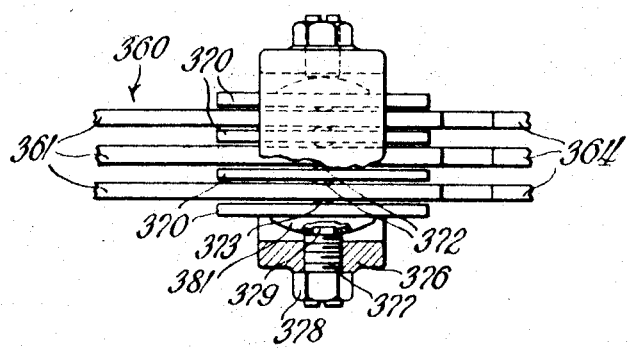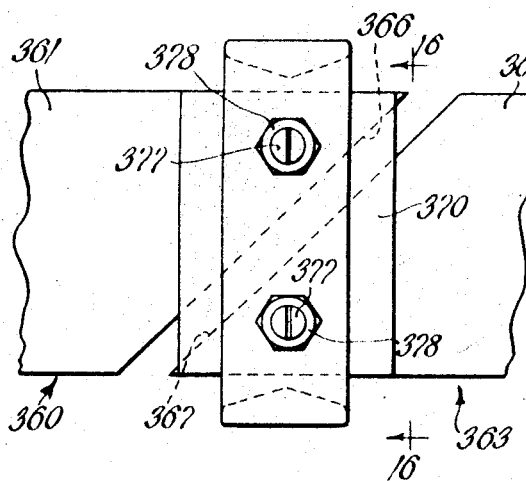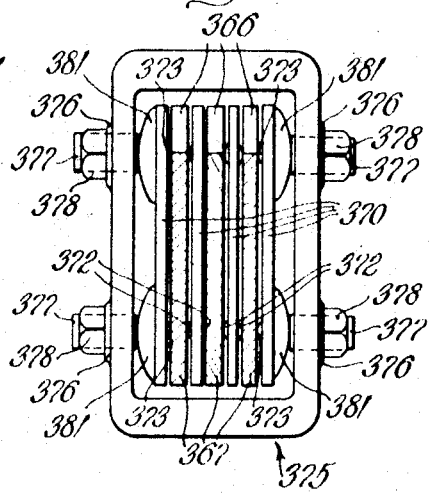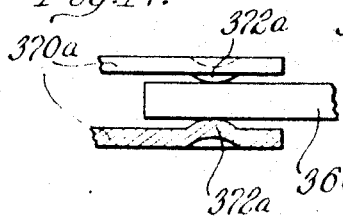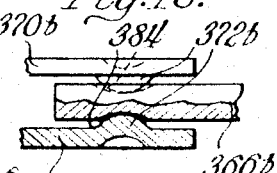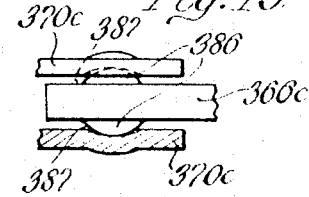

Jan. 7, 1941.  E. S. CORNELL ET AL  2,227,925
SWIVEL CONNECTION FOR SWITCHES, BUS BARS, AND THE LIKE
Filed May 12, 1938  6 Sheets-Sheet 6
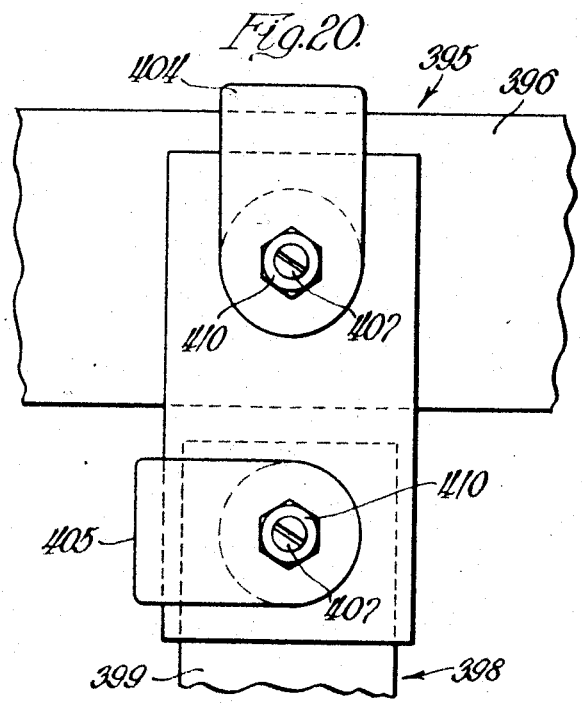
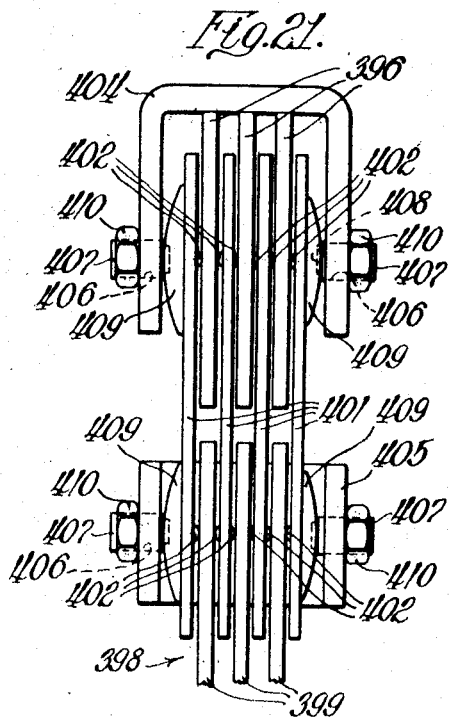
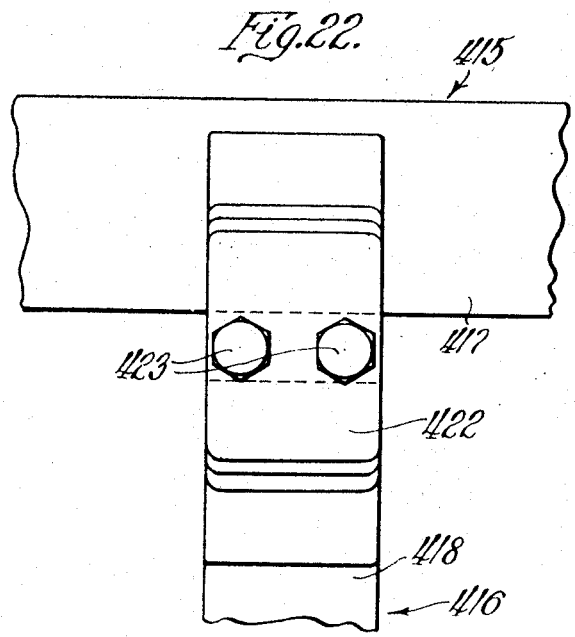
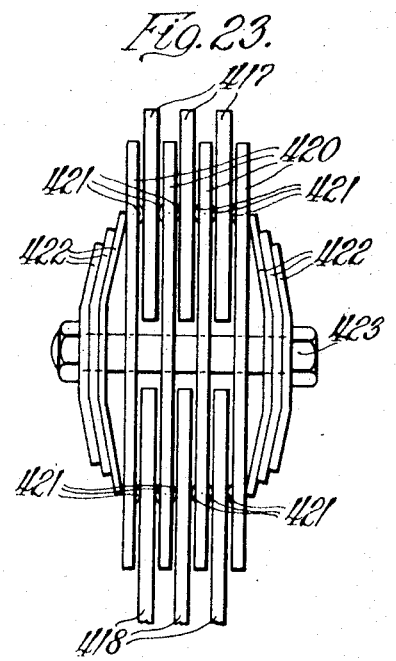
Inventors
Elias S. Cornell
Stanley C. Killian
Joseph A. Stoos Patented Jan. 7, 1941

2,227,925

UNITED STATES PATENT OFFICE 2,227,925

SWIVEL CONNECTION FOR SWITCHES, BUS BARS, AND THE LIKE

Elias S. Cornell, Evanston, Stanley C. Killian, Oak Park, and Joseph A. Stoos, Naperville, Ill., assignors to The Delta-Star Electric Company, Chicago, Ill., a corporation of Illinois Application May 12, 1938, Serial No. 207,495

11 Claims. (Cl. 200—166)

This invention relates to switches and other kinds of electrical connections, and is particularly adapted for use where relatively heavy currents are employed.

The object and general nature of this invention is the provision of two conductors which are mounted for or have relative movement, one with respect to the other, and are connected in current carrying relation by means affording substantially point contact between the conductors and which is disposed in or defines the pivot axis about which one conductor has movement relative to the other. A further feature of this invention is the provision of biasing means maintaining the points of contact under relatively high pressure whereby the movement that one part has to the other insures a good electrical connection between the parts. By disposing the points of contact between the two relatively movable members in line with the pivot axis, the relative movement between the parts keeps the connection clean, so that the members themselves can be used as conductors, thereby eliminating the necessity for extraneous flexible conductors, pigtails and the like heretofore required for connecting two relatively movable parts is entirely eliminated.

The principles of this invention have a wide application in the industry. For example, switches may be constructed with a pivoted blade that is connected to a stationary conductor by point contact means that is disposed in or defines the axis of pivoting movement of the blade unit. Similarly, the pivoted section of the blade itself may be connected by high pressure substantially point contact means which defines the pivot axis of the blade section relative to the main arm thereof, and which at the same time provides the desired current carrying capacity without extra flexible leads or the like. In a similar manner, the various parts of an articulated blade construction may be provided with high pressure point contact means forming or defining the pivot axis between the relatively movable parts.

Further, bus bars may be divided into sections which are connected together by means having high pressure point contact connection with the bus bar sections whereby any relative movement of one section with respect to the other, as may occur due to different temperature conditions from time to time, is accommodated.

These and other objects and advantages of the present invention will be apparent to those skilled in the art after a consideration of the following detailed description, taken in conjunction with the accompanying drawings, in which:

Figure 1 is a plan view of a disconnect switch having a hingedly mounted blade arm and a blade section pivotally connected thereto and in which the principles of the present invention have been embodied;

Figure 1A is a fragmentary view of the blade arm and pivoted section in the relative position in which they are held when the switch is open;

Figure 2 is an enlarged fragmentary side view of the construction shown in Figure 1;

Figure 3 is a section taken along the line 3—3 of Figure 2;

Figure 4 is a fragmentary plan view of a switch arm having a pivoted blade section hingedly connected to the blade arm by means incorporating certain features of this invention;

Figure 5 is a side view, partly in section, of the construction shown in Figure 4;

Figure 6 is a section taken along the line 6—6 of Figure 5;

Figure 7 is a modified form of switch construction embodying the present invention and having a contact assembly of the rotating type with which the free end of the switch blade cooperates;

Figure 8 is a fragmentary plan view of the rotating contact assembly shown in Figure 7;

Figure 9 is a section taken generally along the line 9—9 of Figure 7;

Figure 10 is a side view of a switch construction of the rocking insulator type in which the principles of the present invention have been embodied;

Figure 11 is an enlarged fragmentary view taken substantially along the line 11—11 of Figure 10;

Figure 12 is a fragmentary view taken on the line 12—12 of Figure 10;

Figure 13 is a section taken generally along the line 13—13 of Figure 12;

Figure 14 is a side view of a swivel connection between two interconnected bus bars in which pivotal action is secured by virtue of the maintenance of substantially point contact between the relatively movable parts;

Figure 15 is a fragmentary top view, partly in section, of the swivel connection shown in Figure 14;

Figure 16 is a section taken along the line 16—16 of Figure 14;

Figures 17, 18 and 19 illustrate different ways of producing substantially point contact between the bus bars and the bus bar straps shown in Figures 14 to 16; and Figures 20 to 23, inclusive, show two forms of the present invention as employed in a current carrying swivel connection between a bus and a tap.

Referring now more particularly to the switch construction shown in Figures 1, 2 and 3, this form of switch comprises a stationary conductor member 1 which is mounted on an insulator stack 2 and has a lug 3 carrying bolts 4 by which a cable 5 is connected to the member 1. The stationary conductor member 1 carries one or more contact fingers 7 which are generally U-shaped and formed to receive a blade section therebetween. The present invention is not particularly concerned with the details of the stationary contact of which the members 1 and 7 form a part, but it may be mentioned that the contact fingers 7 may be of the form disclosed and claimed in our copending application, Serial No. 207,494, filed May 12, 1938. The stationary contact structure, which is indicated in its entirety by the reference numeral 10, also includes a hood or shield 11 and a stop 12.

The switch blade unit is indicated in its entirety by the reference numeral 15 and comprises a blade arm in the form of a tubular member 16 which is flattened at its outer end 17 and at its inner end is secured between a clamp 21 and a bracket 22 which are fastened together by bolts 23. The bracket 22 includes a base portion 25 which is fastened in any suitable manner to the upper end of a rotary insulator stack 26. The bracket 22 includes a threaded boss 28 receiving a cap screw 29 which secures a journal bushing 30 to the rotatable insulator stack 26 to move therewith. The bushing 30 is received within the sleeve section 31 of a second stationary conductor member 33 which has a section 34 to which a cable 35 is connected, as by bolts 36.

A pair of conductor straps 39 and 40 are clamped between the cable 35 and the section 34, and one end 41 of the conductor strap 39 is offset so as to provide a space between which the flattened inner end 43 of the blade member 16 is received. From Figure 2 it will be noted that the end of the lower strap 40 is disposed against one end of the sleeve section 31 which is journaled on the bushing 30. The section 41 of the upper strap 39 carries a projection 45 on its lower or inner surface, and the adjacent end of the lower strap 40 carries a similar projection 46 on its upper surface, these projections being in accurate alignment with the axis defined by the cap screw 29 and the bushing 30, this being the axis of rotation of the insulator 26 and attached blade arm relative to the stationary member 33.

According to the present invention, the raised portions or projections 45 and 46 of the conductor members 39 and 40 establish substantially point contact between the stationary conductor 33 and the swinging blade arm, and the points 45 and 46 are forced with high pressure into firm engagement with the flattened end 43 of the blade member 16 by biasing means in the form of one or more dished spring washers 50 which bear against the outer surface of the conductor section 41. The amount of pressure exerted by the biasing means 50 is adjusted by a screw 51 threaded into an apertured boss 52 which is formed at the junction of a pair of arms 54 and 55 which are spaced apart where they join the conductor section 34 so as to receive the conductor bars 39 and 40 therebetween, as best shown in Figure 1. The inner end 57 (Figure 3) of the screw 51 is reduced and enters a suitable opening formed in the spring washer 50, and a lock nut 58 is threaded over the outer end of the screw 51. The pressure exerted by the biasing means 50 may be adjusted by turning the screw 51, and after an adjustment is made the lock nut 58 is tightened to retain the adjustment.

The outer end of the blade arm 16 carries a flat blade section 65, this part being bifurcated, as at 66, at its inner end so as to dispose two portions 67 and 68 on opposite sides of the flattened outer end 17 of the blade member 16. Each of the portions 67 and 68 carries a projection 70, which may be the head of a rivet 71. Bars 74 and 75 are disposed transversely of the end 17 and on opposite sides thereof, and are held in place by a pair of bolts 76 and 77. A flat plate 79 is disposed directly against the outer surface of each of the bars 74 and 75, being apertured to receive the bolts 76 and 77 and having outer apertures in which the stems of the rivets 71 are arranged. Pairs of springs 81 are also clamped in position against the spacing bars 74 and 75 by the bolts 76 and 77, and when the latter are tightened the springs 81 are caused to bear against the outer ends of the rivets 71, forcing the heads 70 thereof into high pressure engagement with the outer end 17 of the switch blade member 16. The rivets 71 are preferably rigidly secured to the portions 67 and 68 of the blade section 65, so that by having the springs 81 press the heads 70 into firm high pressure engagement with the other end of the blade member 16, a current carrying connection is established between the parts 16 and 65, the heads 70 serving as projections or lugs establishing substantially point contact between the parts 16 and 65.

By virtue of this construction, wherein the pivoted part 65 connects the switch arm 16 to the stationary member 1 when the switch is closed, the blade part 65 can pivot with respect to the blade arm 16 about an axis that passes through the points of contact at 70, and the plates 79, being rigidly fastened to the blade arm 16, prevent the points 70 from shifting across or along the flattened end 17. The ends of the portions 67 and 68 of the blade section 65 are each formed with an angled edge, as indicated at 85 in Figure 1, so as to engage the bars 74 and 75, whereby the latter serve as stops limiting the swinging movement of the blade section 65 about the axis defined by the points 70. Figure 1 shows one part of each edge 85 against the associated stop bar whereby the part 65 is prevented from moving in a clockwise direction out of a position aligned with the blade arm 60, and Figure 1A shows the relative position between the arm 16 and part 65 when the other portion of each edge 85 is disposed against the associated stop bar. Normally, the blade section 65 is held in this latter position by means of a coil spring 88 which is disposed about a suitable spacer or sleeve carried by the bolt 76, the latter bolt being longer than the companion bolt 77. One end 89 of the spring 88 is anchored in any suitable manner, as by bearing against the other bolt 77, and the other end 90 of the spring 88 has a bent end 91 received in a hole 92 formed in the blade section 65.

In operation, the blade unit 15 is swung into and out of closed circuit position by rotating the insulator 26, the stationary members 1 and 33 remaining in the positions shown in Figure 1. During the pivotal movement of the blade unit 15, the spring 50 maintains the projections 45 and 46 in firm engagement with the end 43 of the blade member 16, so that as the latter is swung from one position to the other by the rotation of the insulator 26 and the bracket 22 carried thereby, the blade member 16 moves about a pivot axis that is defined by the points 45 and 46. The relative movement of the conducting sections 16 and 33, while the points 45 and 46 are held in engagement with the end 43 with relatively heavy pressure, results in a construction in which the hinge connection between the parts is always maintained clear of the incrustations and the like and in a condition in which there is no substantial resistance to current flow. In other words, opening and closing the switch automatically cleans the points of high pressure engagement at the hinge joint.

In swinging the switch blade unit 15 from an open circuit position into a closed circuit position, the switch blade unit approaches the stationary contact structure 10 with the pivoted section 65 held by the spring 89 in the position shown in Figure 1A and in dotted lines in Figure 1. When the outer end of the part 65 engages the spring fingers 7, the resistance to further relative movement between these parts causes the blade 65 and arm 16 to straighten out until the outer portion of the edge 85 engages the associated stop block. In moving into this position, the arm 16 forces the blade 65 in between the contacts 7 with a toggle action, thereby securing relatively great power for cleaning the contact surfaces, until the blade 65 engages the end of the stop lug 12. This movement of the blade section 65 is against the action of the spring 88, but the force moving the switch into its closed position is sufficient to overcome the spring 88. This arrangement insures a good clean contact between the stationary contact structure 10 and the blade unit, and, at the same time, the pivoting action of the blade section 65 relative to the arm 16 about the points 70 insures a good clean connection at this portion of the blade unit. When the switch is opened by an outward movement of the switch arm 16, the reverse action takes place. The initial movement of the arm or member 16 exerts a powerful force pulling the pivoted blade section 65 away from the stationary contact structure 10 with sufficient force to break any ice or sleet, incrustation or the like, and, like the hinge construction described above, the pivoting action of the blade section 65 relative to the arm 16 in opening and closing the switch insures that the spring biased points of contact, at 70, will be kept clean at all times.

Another form of pivoted blade section, which may be used instead of the pivoted section 65 and associated parts shown in Figures 1 and 2, is illustrated in Figures 4, 5 and 6. In this form of the invention, the switch blade arm is indicated by the reference numeral 16a and consists of a tubular member that has its outer end flattened and slit so as to form two connector sections 101 and 102, each of which has a projection 103 and 104, respectively. A blade section 106, consisting preferably of flat stock, is disposed with its inner end between the portions 101 and 102 and is formed with opposite recesses 107 and 108 in which the projections or raised portions 103 and 104 are adapted to be disposed. A collar 110 is clamped securely to the blade member 16a by means of a bolt 111, and the collar 110 is formed to follow generally the configuration of the flattened end portions 101 and 102 of the member 16a, the collar having a slit 113 and opposite portions 114 and 115 which embrace the inner end of the blade section 106. The collar section 114 is provided with a threaded boss 117 in which an adjusting screw 118 is disposed, the adjusting screw 118 having a lock nut 119. The inner end of the screw 118 is reduced, as at 121, and is disposed in a suitable opening in the spring washer 122, which may be a round dished member as indicated in Figures 1 and 2, but which preferably is generally square in outline and having recesses 123 and 124 at opposite edges. The other collar section 115 is formed with a boss 128 around which a coil spring 129 is disposed. One end 130 of the spring bears against one side of the collar section 115, while the other end 131 is bent outwardly and is disposed in an opening in the blade section 106.

A pair of bolts 136 and 137 extends through suitable openings in the collar section 115, which bolts are threaded into the other collar section 114 so as to keep these sections from spreading apart under the force of the spring washer 122, whereby the latter presses the projections 103 and 104 into firm high pressure engagement with the blade section 106. In this form of the invention, these raised portions or projections 103 and 104 form the sole means establishing a pivot axis about which the blade section 106 can swing relative to the blade arm 16a. The pressure at these points, however, is sufficient to provide for the desired current carrying capacity, and the pressure is adjusted as in the previously described modification by the adjusting screw 118.

The pivotal movement of the blade section 106 is limited by suitable stop means, and normally the spring 129 holds the blade section 106 in a position relative to the blade arm 16a that is comparable to the position of the blade section shown in Figure 1A. The inner end of the pivoted blade section 106 is formed with two arcuate slots 139 and 140 through which the bolts 136 and 137 are respectively disposed. A collar 141 is carried by each of the bolts 136 and 137 and is disposed in the associated slots. The collars 141 serve as rollers providing for substantially free pivotal movement of the blade section 106 about the axis defined by the contact points 103 and 104. The pivoted blade 106 is adapted to be used with a stationary contact structure, such as the structure 10 of Figure 1, in such a way that the initial closing movement and the final opening movement of the blade arm 16a secures the desired scraping or wiping action between the stationary contact structure and the pivoted switch blade 106, in substantially the same manner as described above in connection with Figure 1. The projections 103 and 104 serve as means establishing substantially point contact between the blade arm and the pivoted blade section, which points of contact are in or define the pivot axis between the associated parts.

It is to be understood, of course, that the particular type of hinge shown in Figure 2 is not necessarily required for the pivoted switch blade section of either Figure 1 or Figure 4, for either is capable of being used in a switch independently of the other.

Another form of switch is illustrated in Figure 7, in which the same principles are employed, namely, providing for a pivotal connection between two parts by virtue of means affording substantially point contact between said parts in the axis of pivotal movement, whereby not only is the pivotal movement accommodated, but clean contacts are assured between the parts and relatively high current carrying capacity is provided. The form of the invention shown in Figure 7 is quite similar to that shown in Figure 1 in which a blade unit is pivoted to a stationary member or conductor and the outer end of the blade member is connected to a stationary member or conductor by means of a part that is pivoted to one of them, the hinge pivot and the last mentioned pivot being formed by virtue of point contact means with the points of contact held in relatively high pressure engagement.

Referring now more particularly to Figures 7, 8 and 9, the reference number 150 indicates a stationary member or conductor which is formed to receive a cable connection 151 and is secured in any suitable manner to a stationary insulator stack 152. A second stationary member or conductor 155 is spaced from the member 150 and is provided with sections 156 and 157, the latter being in the form of an apertured boss and receiving a cap screw 158 which is threaded into a boss 159 which forms a part of a bracket 161 that includes a base section 162 bolted or otherwise fixed to one end of a rotatable insulator 163. The bracket 161 has an arm or socket 165 which is formed to receive one end of a switch blade arm 166 in the form of a tubular member having one end 167 flattened and formed with a raised projection or lug 168, and the other or outer end flattened to form a blade section 170. The tubular arm 166 of the switch blade unit is received in the section 165 of the bracket 161 and is secured rigidly to the bracket 161 by a clamp 172 and suitable clamping bolts 173. A raised projection or lug 175 is formed in the section 156 of the stationary conductor 155 directly opposite a recessed portion 176 which receives the projection 168 on the end 167 of the blade member 166. A pair of relatively heavy leaf springs 178 are bolted, as at 179, to the clamp 172 and are so formed that when the bolts 179 are tightened the springs 178 act against the projection 175 to press or force the projection 168 on the blade arm into firm high pressure engagement with the section 156. The projections 168 and 175 form means establishing substantially point contact between the stationary conductor 155 and the switch blade unit, and these points of contact lie within the pivot axis established by the apertured boss 157 and the cap screw 158 which is threaded into the bracket 161. Rotation of the insulator stack 163 swings the switch blade unit about the pivot axis of the switch, and this movement of the switch arm relative to the stationary conductor 155 insures a clean contact at the hinge axis which is maintained under high pressure by the springs 178 at all times. There is sufficient looseness between the apertured boss 157 and the cap screw 158 in an axial direction to permit the springs 178 to maintain the desired high pressure point contact connection between the parts 155 and 166.

The part that connects the blade section 170 of the switch blade unit to the other stationary member or conductor 150 is indicated in its entirety by the reference numeral 190, and comprises a rockably mounted contact structure which, while arranged for pivotal movement with respect to the stationary conductor 150, is maintained in electrical connection therewith and is constructed to receive the blade section 170 of the switch blade unit. Referring now to Figures 7, 8 and 9, a boss 192 is formed on or carried by the conductor member 150 and receives an upwardly extending stud 193 having a rounded upper end 194. A block 196 having a recess 197 is mounted for pivotal movement on the stud 193, the upper end of the recess 197 being rounded, as at 198, on an arc which is larger than the curvature of the stud section 194, whereby there is substantially point contact between the stud 193 and the block 196. The lower end of the block recess 197 is enlarged, as at 201, and receives a coil spring 202, one end 203 of which engages the block 196 while the other end is fixed in any suitable manner to the stud 193 of the boss 192. An extension 205 is formed on or carried by the block 196 and is provided with a rounded upper end 206 which seats in a corresponding recess 207 formed in the overlying end 208 of a bracket 209 which is fastened, as at 210, to the stationary conductor 150. The end 208 of the bracket 209 is formed with a projection 213 which is engaged by one end 214 of a spring 215, the opposite end of which is held in place by the bolt or cap screw 210. It will be noted that the projections 194, 206 and 213 are aligned and, moreover, provide points of contact between the relatively movable parts, which points of contact are maintained under relatively high pressure by the spring 215.

The pivoted block 196 serves as a contact base for a plurality of spring contact units 220, each consisting of a generally U-shaped conductor member having inturned ends 222 with contact projections 223 and one or more springs 224 which are also U-shaped and held in nested relation with respect to the conductors 221 and with their ends bearing against the inturned ends 222 of the conductors. A contact unit of this type is disclosed and claimed in our copending application identified above, so that a further description of these units is unnecessary. Each unit is secured rigidly to the contact base 196 by means of a cap screw 226, as indicated in Figure 8, so as to swing therewith about the axis defined by the point contact means shown in Figure 9.

A blade engaging arm 230 has an outwardly disposed end 231 and an inner end 232, the latter being apertured to receive the several cap screws 226 so that the arm 230 is held in position to rotate with the contact base 196. A stop member 235 is fixed to the stationary conductor member 209 by a pair of countersunk screws 236, and the stop member 235 has one end 238 engageable with the arm 230 when the rockable contact unit 190 is aligned with the blade section 170 in the fully closed position of the blade, and another arm 239 is carried by the member 235 to serve as a stop for the rockable contact assembly in the open circuit position of the parts, the assembly being normally held in this position by the coil spring 202 when the switch blade unit is disconnected or out of contact with the part 190. This latter position of the part 190 is indicated partially in dotted lines in Figure 8.

The end of the blade section 170 is provided with an extension or shouldered portion 241 which, when the switch is closed, is adapted to engage behind a spring finger 242. The latter includes a base section 243 clamped to the rocking contact base 196 by a plate 244 and one or more set screws 245.

The switch blade unit which is preferably used with the rocking contact assembly of Figures 7, 8 and 9 consists of a single rigid member, as illustrated in Figure 7. When the switch blade 166 is swung about its axis, defined by the cap screw 158 of the point contacts at 168 and 175, on one stationary member 155 toward the other contact structure 150, the blade section 170 approaches the part 190 with the latter in the position indicated in dotted lines in Figure 8. After the flattened blade section 170 starts to enter the fingers of the contact assembly, when the blade first begins to enter the rocking contact 190, the leading edge of the switch blade first engages the section 231 of the arm 230 which causes the part 190 to rock about the axis defined by the point contacts 194 and 206, the projections 223 of the spring contacts 220 wiping across the sides of the blade section 170 until finally the parts are aligned and the arm 230 engages the stop section 238, as shown in full lines in Figure 8, at which time the shouldered portion 241 snaps behind the spring 242. If desired, the arm section 231 may be omitted and reliance placed upon the frictional drag between the blade and contact fingers to rock the part 190 into its closed circuit position. In opening the switch, the shoulder 241 on the blade section 170 engages the spring arm 242 for the purpose of positively swinging the part or contact assembly 190 back into its open circuit position (dotted lines shown in Figure 8), so that reliance is not placed solely on the coil spring 202 to return the rocking contact assembly 190 to its open circuit position.

A third form of switch embodying the high pressure current-carrying point contact feature of this invention is shown in Figure 10. In this figure, two stationary conductors 270 and 271, each with its associated cable 273 and 274, are adapted to be electrically connected by an articulated switch blade unit which includes two sections pivotally connected to each other, one being pivotally connected to a rocking insulator which includes a conductor adapted to connect that section to one of the stationary members, the other section of the switch blade unit being pivotally connected to the other stationary conductor member.

Referring now more particularly to Figures 10, 11, 12 and 13, the stationary contact member 270 includes a terminal section 277 fastened to a stationary insulator stack 280 which is mounted by a suitable standard 281 on a base 282. A rocking insulator 285 is carried on a standard 286 that is pivoted at 287 to a bracket 288 carried by the base 282. The outer end of the rocking insulator 285 carries a part 290 having terminal sections 292 and 293 and a base 291 secured to the insulator 285. A U-shaped bracket 295 (Figure 13) is fastened by a cap screw 296 to the base 291 on the insulator 285 and has ends 298 and 299 disposed alongside the terminal sections 292 and 293 and apertured to receive the ends of a pivot pin 301.

The other stationary member 271 is formed with a terminal arrangement similar to the terminal 290 just described. The stationary member 271 carries two terminal sections 303 and 304 (Figure 11) between which a U-shaped member 305 is fastened, as by a cap screw 306. The ends of the U-shaped member 305 are apertured to receive a pivot pin 308.

As mentioned above, the switch blade unit includes two sections, one of which is indicated in its entirety by the reference numeral 312 and comprises two conductor bars 313 and 314, each provided with bosses or projections 315 and 316 (Figure 11) at their ends, and inwardly of the bosses 315 and 316 the bars 313 and 314 are apertured to receive bolts 317 which secure brackets 318 that hold the bars 313 and 314 in spaced relation. Each bracket 318 includes a central section 320, and the bracket 318 of the end of the section 312 which is connected to the stationary member 271 is apertured and receives or is mounted upon the pivot pin 308. The construction is such that the bosses 315 at this end of the section 312 are aligned with the axis of the pivot pin 308, so that as the section 312 pivots with respect to the stationary member 271, the pivot axis passes through the bosses 315 which establish substantially point contact between each of the bars of the switch blade section 312 and the associated section of the stationary terminal.

In order to secure the desired high pressure engagement between the points of contact, one or more springs 321 having inturned ends 322 and 323 are placed against the outer faces of the bars 313 and 314. The springs 321 are apertured to receive the associated bolt 317, so that when the latter is tightened, not only are the bars 313 and 314 clamped to the associated bracket, but, in addition, the springs 321 serve to force the ends of the bars into high pressure engagement at the points 315 with the associated terminal. The other end of the section 312 is of similar construction.

The other section or part of the switch blade unit is indicated in its entirety by the reference numeral 328, and is of similar construction, comprising two bars 329 and 331 between which a bracket 332 is disposed at the end of the section that is pivoted to the section 312. The bracket 332 includes two sections 333 and 334 which are apertured and receive a pivot pin 335 on which the lug 320 of the adjacent bracket 318 is mounted for relative pivotal movement. It will be noted that the pivot pin 335 is in alignment with the bosses 316 at this end of the blade section 312, and that the springs 321 at this end force the bosses or projections 316 into firm high pressure engagement with the bars 329 and 331 of the adjacent part or section 328. A bolt 330 clamps or secures the bars 329 and 331 to the bracket or spacer 332.

The other end of the section 328 is pivoted to the terminal 290 in a manner similar to the pivots described above. As will be clear from Figure 12, the bars 329 and 331 diverge outwardly to a certain extent with respect to the pivot connection between the two sections 312 and 328, and have end portions 338 and 339 which are disposed on the outer sides of the terminal sections 292 and 293. The ends 338 and 339 are formed with bosses or projections 341 and 342 which are aligned with the axis of the pivot pin 301 and are held in high pressure engagement with the terminal sections 292 and 293 by springs 343, which may be similar to or identical with the springs 321 described above. The ends 338 and 339 of the bars 329 and 331 are held in spaced apart relation by a bracket 345 through which a bolt 346 passes, the latter serving also as means for clamping the springs to the section in order to secure the desired high pressure engagement. The bracket 345 has an extended lug 346 which is apertured to receive the pin 301 and forms the means by which the section 328 is pivoted to the rocking insulator about a pivot axis that passes through the bosses or projections 341 and 342.

The rocking of the insulator 285 from one position to another, as from the full line position shown in Figure 10 to the dotted line position thereof, serves to connect and disconnect the stationary conductor members 270 and 271, and in the rocking movement of the insulator 285 the pivotal movement of the parts making up the articulated blade or connection is accommodated by the disposition of the bosses in such position that they are pressed against the cooperating parts so as to establish point contacts therewith, which points are in accurate alignment with the actual pivot axis between the sections and associated elements. In this way, the sections or links 312 and 328 can be utilized for carrying the current when the switch is closed, thereby eliminating any necessity for additional flexible connectors or similar means. The movement of the insulator 285 is controlled by any suitable means, such as a link and arm arrangement connected with the shaft 287. As will be apparent, disconnect switches of this type are frequently arranged for gang operation, in which case the rocking insulator 285 of the several switches would be connected with the same shaft 287.

The principles of the present invention may also be embodied in current carrying structures in which relative movement between parts must be accommodated but which are not in the nature of disconnect switches or the like. For example, it has been found that the expansion in a relatively long bus bar due to an increase in temperature therein may be considerable and may result in objectionable lateral deflections where the ends of the bus bar are fixed.

Figures 14, 15 and 16 illustrate a swivel connection between two bus bar sections which accommodate substantial changes in length of the bus bar without interfering with the current carrying capacity of the unit. Referring now to Figures 14, 15 and 16, a bus bar section is indicated at 360 and comprises a plurality of bus bars or conductors 361. The companion bus bar section is indicated in its entirety by the reference numeral 363, and likewise comprises a plurality of bus bars or conductors 364. The adjacent ends of the bus bars 361 and 364 are cut at an angle to the longitudinal axis of the bus bar structure so as to form overlapping portions, indicated at 366 and 367. A plurality of transverse straps 370 are provided, these straps being formed of conducting material and one being disposed between adjacent bus bars and all of them are arranged adjacent the overlapping portions 366 and 367 of the bus bars. The connecting straps that are placed between two bus bar sections are provided with two raised portions 372 adjacent each end, and the portions 372 are disposed directly opposite one another on opposite faces. The conducting straps on the outer sides of the bus bars may have only one boss or projections 373 at each end thereof, but, if desired, the outer straps may be made identical with the intermediate straps for convenience of manufacture.

A yoke 375 encircles the conducting straps 370 and associated portions 366 and 367 of the bus bars. The yoke 375 is provided with four threaded bosses 376, and an adjusting screw 377 is disposed in each of the apertured bosses 376. Each screw has a lock nut 378 by which the desired adjustment may be retained. The inner end of each of the adjusting screws 377 is reduced, as at 379 (Figure 15), and is received in the aperture in a spring washer 381, which may be similar to or identical with either of the spring washers 50 and 122 described above.

As will be apparent from Figures 15 and 16, the position of the adjusting screws relative to the bosses or projections 372 and 373 is such that all of the raised projections and adjusting screws for one of the bus bar sections are in alignment, and the adjusting screws and raised projections on the connecting strap members for the other bus bar sections are also in alignment, thereby defining parallel pivot axes about which the yoke 375 and associated connecting straps may swing with respect to the bus bar sections 360 and 363, whereby any change in length of the bus bar structure will be accommodated by a slight swinging movement of the connecting yoke and associated connecting straps. The adjusting screws 377 are tightened so that the raised projections or bosses establish high pressure points of engagement between the various parts, which points are aligned in the aforesaid pivot axis or axes.

The present invention is not particularly concerned with the exact form the raised projections or bosses may take, inasmuch as any one or more of several forms may be employed. For example, in Figure 17, conducting straps are indicated at 370a as having portions pressed out of the plane of the straps to form the raised parts 372a. In this construction, the associated bus bar section 366a has its side faces planar. This construction may be adapted for the outer connecting straps and for swivel connections where the bus bar construction includes only one line of bars. Figure 18 shows an arrangement similar to Figure 17, but differs therefrom in that the connecting straps 370b have bosses 372b which are formed by somewhat deeper or more extended bosses 372a and in which the adjacent faces of the bus bar 366b have recesses 384 to receive the bosses 372b. This construction is similar to the high pressure pivot arrangement illustrated in Figure 6, and has the advantage of forming or establishing the pivot axis somewhat more positively than the construction shown in Figure 17. Figure 19 illustrates an arrangement in which the bus bar 366c is formed with opposite projections or bosses 386 which are received in recesses 387 formed in the associated connecting straps 370c. If desired, the bus bar construction indicated in Figure 19 may be employed with planar connecting straps in which neither bosses nor recesses appear. For the connecting straps that are disposed between two bus bar sections there may be bosses formed on both sides in any suitable manner, or pairs of straps, such as 370a and 370b may be employed.

In some cases it may be desired to connect a tap to a bus in such a way that there may be some relative movement between the bus bar and tap.

Referring now to Figures 20 and 21, a bus is indicated at 395 and comprises a plurality of bus bars 396. The tap is indicated at 398 and comprises a number of bars 399 disposed in the planes of the bars 396. A plurality of straps 401 are disposed in between the bars 396 and 399 and on the outer faces thereof. Each of the straps is formed of conducting material and is provided with bosses 402 on opposite faces. A pair of yokes 404 and 405 are provided, one embracing the bus 395 and the other embracing the tap 398. The ends of each of the yokes is provided with a threaded opening 406 in which an adjusting screw 407 is threaded. The inner end of the adjusting screw 407 is reduced, as at 408, and seats in an opening in an associated spring washer 409. A lock nut 410 is threaded onto the outer end of each of the adjusting screws 407.

The conducting straps 401 and the yokes 404 and 405 are so constructed that they may be assembled over the bus and tap in the relation best shown in Figure 21, with the spring washers 409 bearing against the outer conducting straps when the latter are arranged with the raised projections 402 aligned. Then by tightening the adjusting screw 407, the desired amount of pressure may be applied to the straps and associated bus bars. As will be noted, the bosses 402 provide substantially points of contact, which points are aligned to define parallel axes about which the straps moving together may pivot with respect to either the bus 395 or the tap 398, whereby relative movement between the bus and tap can be accommodated without any loss of current carrying capacity between the bus and tap. In fact, relative movement between the parts keeps the points of contact clean and bright and facilitates the maintenance of a good electrical connection between the bus bars and the bars constituting the tap.

Figures 22 and 23 illustrate a modified form in which, instead of employing dished spring washers for the biasing means maintaining substantially high pressure at the points of contact between the conducting straps and the associated conducting bars and associated clamping yokes, a simple assembly of leaf springs and one or more clamping bolts are employed. Referring now to Figures 22 and 23, the bus is indicated at 415 and the tap at 416. The bus consists of a plurality of bus bars 417, and the tap consists of a plurality of conducting bars 418. The connecting straps or conducting members are indicated at 420, and each is provided with bosses 421 at opposite ends. Preferably, the intermediate conducting straps 420 have pairs of bosses 421 at their ends, while the outer conducting straps have only one boss at each end. A plurality of leaf springs 422 are disposed at each side of the connection and are arranged to bear against the conducting straps substantially at the points where the bosses 421 are formed. The leaf springs are apertured centrally and receive two clamping bolts 423 which pass through the springs and also central openings in the conducting straps 420. The leaf springs 422 are bowed, as best shown in Figure 23, so that when the bolts 423 are tightened the raised portions 421 of the conducting straps are forced with substantially high pressure into firm engagement with the associated conducting bars. As in the form of the invention shown in Figures 20 and 21, the bosses are aligned to provide parallel pivot axes about which the severed connecting bars 420 may move relative to either the bus 415 or the tap 416, or both, as required.

While we have shown and described above the preferred means in which the principles of the present invention have been embodied, it is to be understood that our invention is not to be limited to the particular details shown and described, but that, in fact, widely different means may be employed in the practice of the broader aspects of our invention.

What we claim, therefore, and desire to secure by Letters Patent is:

1. In a high potential current carrying unit, the combination of two pivotally associated conductors, one having a rounded protuberance and the other having a differently curved surface which is engaged by the protuberance on said first conductor with substantially point contact, said conductors being capable of relative pivotal movement about a pivot axis substantially coincidental with said point contact, and pressure exerting means for pressing said pointed protuberance and said differently curved surface into high pressure engagement with each other at said point contact.

2. The combination set forth in claim 1, further characterized by said one conductor having two parts spaced apart from each other and the adjacent inner surfaces of said parts having aligned protuberances which are rounded, said other conductor being disposed between said parts and being of flatter curvature on opposite sides, with said protuberances in substantial point contact therewith and defining the axis of pivotal movement between said conductors, said pressure exerting means having means serving as a yoke which clears the zone of point contact but bears against said parts at the sides thereof opposite said protuberances.

3. The combination set forth in claim 1, further characterized by said pressure exerting means including a spring member extending generally longitudinally of the member having the rounded protuberance, and secured at one end to said member and arranged at its other end to press said rounded protuberance into high pressure engagement per unit area at the zone of point contact between said rounded protuberance and the associated surface on the other conductor.

4. The combination set forth in claim 1, further characterized by said one conductor having the rounded protuberance on one side and a curved recessed section on the other side and axially aligned therewith, and the other conductor comprising two parts embracing said one conductor, one of said parts having a projecting section with a contact end rounded and of greater curvature than the curvature of said recessed section, and engaging the latter with substantially point contact, the other part of said other conductor including a spring biased section engaging the rounded protuberance on said one conductor with substantially point contact, said two points of contact defining the pivot axis between said conductors.

5. The combination set forth in claim 1, further characterized by said one conductor having two parts spaced apart from each other and the adjacent inner surfaces of said parts having aligned protuberances which are rounded, said other conductor being disposed between said parts and being of flatter curvature on opposite sides, with said protuberances in substantial point contact therewith and defining the axis of pivotal movement between said conductors, said pressure maintaining means having means serving as a yoke which clears the zone of point contact but bears against said parts at the sides thereof opposite said protuberances, and a spring member pivotally connected with said yoke means and bearing against the outer side of one of said conductor parts for holding the protuberance at the inner surface thereof in high pressure point contact with the other conductor, the pivot axis between said spring means and said yoke means coinciding with the pivot axis established by said points of contact.

6. A high potential switch comprising a pair of pivotally associated current carrying members, one having two spaced apart sections, each section having an inwardly extending rounded protuberance, said protuberances being in alignment, the other current carrying member having a section of flatter configuration than said rounded protuberances and receiving the latter in substantially point contact, the points of contact lying in the pivot axis about which one member may move with respect to the other, means bearing against said members generally in line with said pivot axis, but outwardly of said points of contact, for maintaining high pressure per unit area at said points of contact, said means being arranged to one side of the pivot axis at the zones of point contact between said members, and a pair of pivotally connected brackets, one fixed to each of said members, and the pivot axis thereof coinciding with the pivot axis at said points of contact.

7. A high potential switch as defined in claim 6, further characterized by a spring biased member carried at the outer side of each section of said one current carrying member and having an end bearing against the outer side of each section generally in axial alignment with the points of contact between the inwardly extending protuberances and the cooperating section of said other current carrying member, and means spaced from the pivot axis at said points of contact for biasing said spring members to hold said protuberances firmly against said other current carrying member.

8. A high potential switch as defined in claim 6 further characterized by said pressure maintaining means consisting of a spring disposed at the outer side of each section of said one current carrying member and extending generally longitudinally thereof, the ends of said spring being turned inwardly and one end of each spring bearing against the associated sections at a point adjacent the pivot axis passing through said points of contact, and bolt means adjacent the other end of each of said springs clamping the latter to said sections, said bolt means also securing the associated bracket to said one current carrying member.

9. A high potential switch as defined in claim 6, further characterized by said brackets being pivotally connected together for relative movement one with respect to the other along said axis.

10. In a high potential current carrying unit, a pair of pivotally associated conductors, one having a rounded protuberance with a pointed contact end and the other conductor having a section of generally flatter curvature engaged by the end of said protuberance in substantially point contact, said conductors being pivotally connected to move relatively to each other about an axis that passes through said point of contact, and means for pressing said pointed protuberance and flatter section into high pressure contact comprising a generally flat spring member extending generally longitudinally of one conductor with its biased end adjacent said pivot axis, a member associated therewith and reacting against the other conductor, and connecting means extending around said zone of point contact for connecting said members together.

11. In a current carrying device of the class described, the combination of two pivotally associated conductors, one conductor having a rounded protuberance and the other conductor having a surface which is relatively flat compared to said protuberance and which is engaged by said protuberance with substantially point contact, one of said conductors being capable of pivotal movement relatively to the other about a pivot axis substantially coincidental with said point contact, and pressure exerting means for pressing said pointed protuberance and said relatively flatter surface into high pressure engagement with each other at said point contact, said pressure exerting means comprising means engaging at least one of said conductors in such relation as to permit relative rotation between said conductor and said means, and bearing against both of said conductors in line with said point contact but spaced axially from the zone of said point contact, whereby said point contact establishes and lies in said pivot axis of the conductors.

ELIAS S. CORNELL.
STANLEY C. KILLIAN.
JOSEPH A. STOOS.